United States Patent [19]

Bhattacharya

[11] Patent Number: 5,704,054
[45] Date of Patent: Dec. 30, 1997

[54] COUNTERFLOW PIPELINE PROCESSOR ARCHITECTURE FOR SEMI-CUSTOM APPLICATION SPECIFIC IC'S

[75] Inventor: Debashis Bhattacharya, Hamden, Conn.

[73] Assignee: Yale University, New Haven, Conn.

[21] Appl. No.: 438,662

[22] Filed: May 9, 1995

[51] Int. Cl.$^6$ .................. G06F 9/30; G06F 9/38
[52] U.S. Cl. ............ 395/388; 395/376; 395/580; 395/385; 395/800
[58] Field of Search ................... 395/800, 376, 395/580

[56] References Cited

U.S. PATENT DOCUMENTS 5,572,690  11/1996  Sproull et al. ............. 395/800
5,600,848  2/1997  Sproull et al. ............. 395/800

OTHER PUBLICATIONS

Sproull et al., "The Counterflow Pipeline Processor Architecture," *IEEE Design &Test of Computers*, v. 11, iss. 3, Fall 1994, pp. 48–59.
Sproull, et al., IEEE Design & Test of Computers FAU, 1994, pp.48–59 Counterflow Pipeline Processor Architecture.

*Primary Examiner*—William M. Treat
*Attorney, Agent, or Firm*—Ohlandt, Greeley, Ruggiero & Perle

[57] ABSTRACT

A pipeline processor provides an instruction flow in a first direction and a data flow in an opposing direction. The pipeline processor includes program circuitry for issuing instructions in the first pipeline direction, with at least some instructions including user-defined operation codes. A result register stores and issues data in the opposing pipeline direction. Plural pipeline stages connect the program circuitry and the result register. A pipeline stage comprises instruction latch circuitry connected to receive and issue instructions in the first pipeline direction, and result latch circuitry connected to receive and issue result data in the opposing pipeline direction. Certain pipeline stages include a conversion module for determining a correspondence between a user-defined operation code and the pipeline operation code and, upon determining such a correspondence, causing the logic circuitry within the pipeline stage to commence execution of the pipeline operation code. Processor siding circuitry is coupled to at least some of the pipeline stages and performs logical operations on the result data in accordance with a pipeline operation code. Multi-threading and branch prediction capabilities are provided.

8 Claims, 8 Drawing Sheets

COUNTERFLOW PIPELINE PROCESSOR ARCHITECTURE FOR SEMI-CUSTOM APPLICATION SPECIFIC IC'S

FIELD OF THE INVENTION

This invention relates to application-specific integrated circuits (ASICs) and, more particularly, to an architecture for a semi-custom ASIC which employs an embedded processor.

BACKGROUND OF THE INVENTION

Over the last 15 years, ASIC design and manufacturing has evolved into a multi-billion dollar industry. ASIC designs can be broadly divided into four categories: (1) full custom design; (2) standard cell-based design; (3) gate array and sea-of-gates designs; and (4) designs using fully programmable components. These designs can be arranged in hierarchy in terms of two opposing characteristics, i.e., level of automation in the design process versus quality of the design, as measured in terms of active circuit area, speed, power consumption etc. For example, full custom design ASICs and standard cell-based design ASICs are generally fabricated from scratch, whereas ASICs based on gate arrays are mostly prefabricated and programmable ASIC devices are completely pre-fabricated and are user-customized via programming only.

Full custom design and standard cell-based ASIC designs show highest quality results, while gate arrays and programmable devices show lesser levels of quality. Nevertheless, the latter two subcategories of ASICs can be designed using high levels of automation—and thus often exhibit lesser cost. The latter categories of ASICs are commonly referred to as semi-custom designs and are better suited for rapid prototyping as compared to full custom or standard—cell based designs.

Semi-custom ASIC designs are often based upon the assumption that the structure of user-defined circuits can not be predicted in advance and hence, must be treated as completely "random". As a result, research into semi-custom ASIC designs has been devoted to fine-tuning structures of pre-fabricated components and to physical design issues, such as layouts of object blocks, interconnection channels, structure of programmable switches, device placement and routing of logic blocks.

The concept of random interconnection between logical blocks has been extended to cover multibit logic blocks, as well. An example of such an ASIC design is the ORCA chip created by AT&T (see Britton et al., "Optimized Reconfigurable Cell Array Architecture for High Performance Field-Programmable Gate Arrays", Proceedings 1993 Custom Integrated Circuits Conference, May 1993, pages 7.2.1–7.2.5). The ORCA chip uses logic blocks which include static random access memory and field programmable gate arrays. Each logic block can either be used for implementation of random logic or for implementation of data path logic, e.g., adders, multiplexers, etc. The ORCA chip, as is common with other ASIC platforms, still is based upon the concept that an ASIC must be designed so as to assure "random" interconnection of multi-bit logic blocks.

Similar philosophies have been used to design digital signal processing systems (see Chen et al., "A Reconfigurable Multi-Processor IC for Rapid Prototyping of Algorithmic-Specific-High-Speed DSP Data Paths", IEEE Journal of Solid States Circuits, Vol. 27, No. 12, December 1992, pages 1895–1904).

It is now common for ASICs to include embedded processors which allow sophisticated data processing. Some ASIC structures further include pipeline data processing blocks which are not at all "random" in structure. In any ASIC platform to be used for high performance data processing, certain architectural features are desirable. They are: pipelining, caching of data, dynamic branch prediction, multi-threading, etc. Recently, a new processor architecture has been suggested by Sproull et al. which manifests a high degree of pipelining in its architecture, i.e. see "Counter-Flow Pipeline Processor Architecture" IEEE Design & Test of Computers Fau, 1994, pp. 48–59. The Counterflow Pipeline Processor (CFPP) Architecture employs a bi-directional pipeline as the central control mechanism. Instructions flow in one direction in the pipeline and data embodying processed results flows in the opposite direction.

Referring to FIG. 1, a block diagram illustrates an exemplary CFPP processor. A relatively long pipeline of logic circuits connects an instruction fetch unit 10 at one end of the pipeline, with a register file 12 at the other end of the pipeline. Instruction fetch unit 10 includes a program counter 14 which feeds program count values to an instruction fetch launch module 16. Each program count causes an instruction fetch command to be transferred to an instruction cache 18 which responds by inserting the requested instruction into instruction recover module 20. Instructions move in FIG. 1 from left to right in the diagram and results (i.e. data) move from right to left. Data processing and data storage actions occur in "siding" modules such as data cache module 22, data memory module 24, multiplier module 26 and adder module 28.

When an instruction is received in instruction recover module 20 from instruction cache 18, it is passed to a decode module 30. In turn, decode module 30 transmits to register file 12 an indication of the data that is required to enable execution of the decoded instruction. This identification data is termed "binding" data by Sproull et al. and results in the launch, by register file 12, of the requested data into the processor's central pipeline (i.e. from right to left). Each instruction carries with it a "binding" for its source operands and its destination in the pipeline. Each binding associates a data value with a register name and thus enables register file 12 to identify the proper data to be launched. Bindings are matched based upon matches of register names.

Each pipeline stage is adapted to detect a match between an instruction binding and a result binding. Thus, when an instruction binding arrives at a pipeline stage and is found to match a result binding, the result values are written into the instruction. If the opcode is to be executed by the pipeline stage, such action occurs. Otherwise, the instruction continues down the pipeline until it reaches a stage wherein the opcode is to be executed. In addition, under certain circumstances when a binding match occurs, a destination value can be copied into a result.

A pipeline stage wherein an instruction operation code is to be executed is, for instance, adder launch module 32 wherein an add instruction is both recognized and causes data having a proper binding value to be fed to adder 28 wherein a sum is created and then fed to add recover module 34. The result data then propagates to register file 12 and is stored.

In FIG. 2, a representative CFPP module is shown comprising an instruction register 40 and a result register 42. A logic circuit 44 couples instruction register 40 and result register 42 and provides further communication with processor siding modules (not shown). Instruction register 40 comprises plural source registers 46 and 48 and a destination register 50. Each source register has a data section 52 for holding the data to be operated upon. Destination register 50 includes a register section 54 for holding the results of a calculation based upon data held in data sections 52. Instruction register 40 further includes an operand code section 56 for defining an operation to be performed with respect to data held in source registers 46 and 48. Each of the source and destination registers includes a section 58 that carries a binding value (e.g. a register name in register file 12).

In similar manner, result registers 60 and 62 also contain binding value sections 64. By comparison of binding values 58 and 64 in logic circuit 44, a pipeline stage is able to determine which data passing through result register 42 is to be associated with an instruction in instruction register 40.

Each register section in instruction register 40 and result register 42 further includes a validity bit position 66 which indicates whether the data in the register section is "valid" data. If the data is not valid (has not been acted upon, as yet), bit positions 66 indicate the data is invalid.

Whenever an instruction is executed, the results are used in two ways. First, the result is entered in destination section 50 of instruction register 40 and is eventually entered into register file 12. Second, the result data is inserted into the results pipeline so that it may be observed by subsequent instructions. Any later instruction whose binding matches the binding of the result data will acquire the result data by copying and retaining the result data into its instruction register in the instruction pipeline. Such result/instruction binding comparisons are carried out in comparison modules 70 (see FIG. 2).

While the CFPP architecture uses a high performance pipelining architecture, it does not readily lend itself to semi-custom ASIC applications. For instance, a given CFPP is only able to recognize and execute operation codes that are specially designed for implementation by that processor. Further, as presented by Sproull et al., it includes no ability to implement dynamic branch protection or multi-threading wherein plural processes are executed simultaneously.

Accordingly, it is an object of this invention to provide an improved semi-custom ASIC architecture.

It is a further object of this invention to provide a semi-custom CFPP architecture which enables user defined operation codes to be recognized and executed by pipeline stages.

It is yet another object of this invention to provide a semi-custom CFPP architecture for an ASIC with both multi-threading and dynamic branch protection functionalities.

SUMMARY OF THE INVENTION

A pipeline ASIC processor provides an instruction flow in a first direction and a data flow in an opposing direction. The pipeline processor includes program circuitry for issuing instructions in the first pipeline direction, with at least some instructions including user-defined operation codes. A result register stores and issues data in the opposing pipeline direction. Plural pipeline stages connect the program circuitry and the result register. A pipeline stage comprises instruction latch circuitry connected to receive and issue instructions in the first pipeline direction, and result latch circuitry connected to receive and issue result data in the opposing pipeline direction. Certain pipeline stages include a conversion module for determining a correspondence between a user-defined operation code and the pipeline operation code and, upon determining such a correspondence, causing the logic circuitry within the pipeline stage to commence execution of the pipeline operation code. Processor siding circuitry is coupled to at least some of the pipeline stages and performs logical operations on the result data in accordance with a pipeline operation code. Multi-threading and branch prediction capabilities in a CFPP environment are provided. Thus, once a user defines (i) interconnections for a specifically required processor and (ii) a set of opcodes to accomplish a data processing action, no further alterations to the preexisting ASIC structure are required.

DETAILED DESCRIPTION OF THE INVENTION

Figure 1:
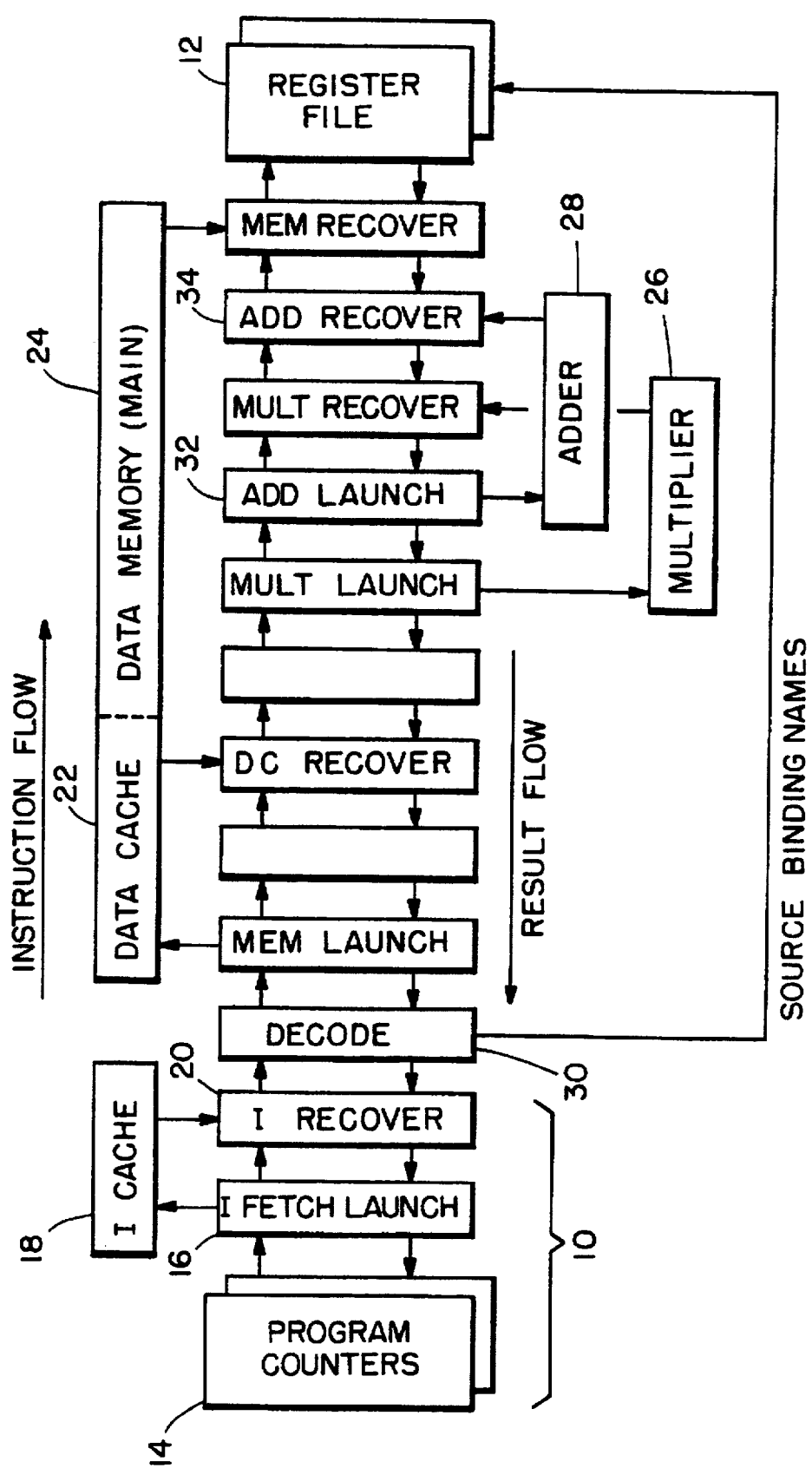
FIG. 1 is a block diagram of a prior art counterflow pipeline processor (CFPP) architecture.
Figure 2:
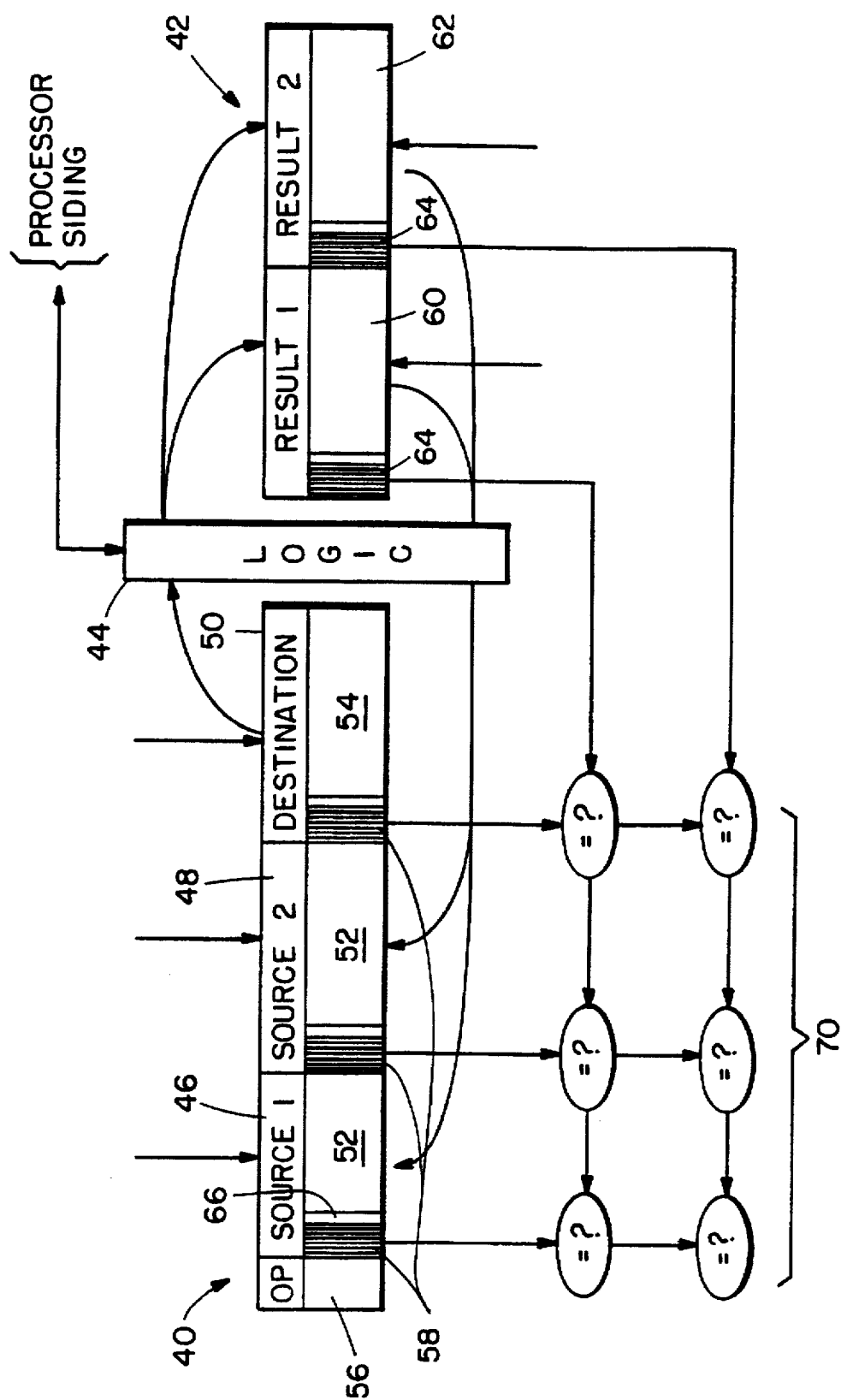
FIG. 2 is a block diagram of a prior art pipeline stage used in the CFPP system shown in FIG. 1.
Figure 3:
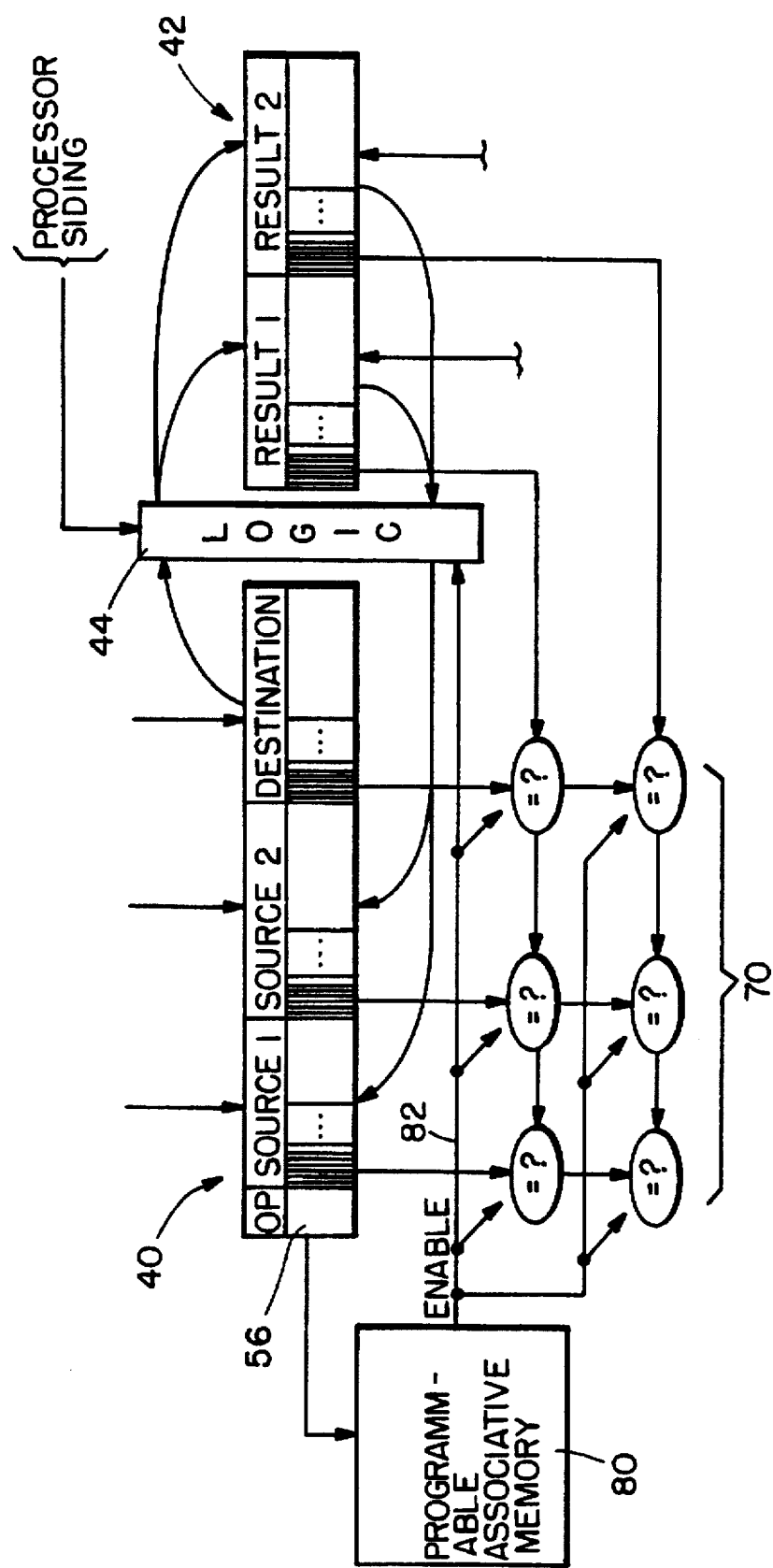
FIG. 3 is a block diagram of a pipeline stage employed in a CFPP architecture embodying the invention hereof.

Referring now to FIG. 3, a pipeline stage comprising instruction register 40 and result register 42 is identical to that shown in FIG. 2 except that a programmable associative memory is coupled to opcode latch 56. A user-opcode appearing in opcode latch 56 is not recognized by logic 44 as requiring performance of a specific function. Instead, the user-originated opcode received via the instruction pipeline into opcode latch 56 is fed to user-programmable associative memory 80, wherein each CFPP opcode is associated with a user-entered opcode. More specifically, instruction cache 18 (FIG. 1) has been preloaded with user-originated opcodes which are not, by themselves, executable by the pipeline stages. It is only when a user-defined opcode appears in opcode latch 56 and is matched to the content of programmable associative memory 80 that it can be executed. That execution occurs when the user-entered opcode is found to match a CFPP opcode that is executable by the particular pipeline stage. Upon such a finding, programmable associative memory 80 issues an enable signal to logic circuit 44 and to matching circuits 70. When thus enabled, the pipeline stage operates as a normal CFPP stage performing operations like updating instruction and result binding values fields, interacting with siding units, etc. More specifically, the inclusion of programmable associative memory 80 enables each of the CFPP pipeline stages to be employed "as-is" without requiring circuitry or logic changes and without knowledge of what the user-defined opcodes will be—except for the matching of the user-defined opcode with a CFPP predetermined opcode to cause generation of the enable signal.

Figure 4:
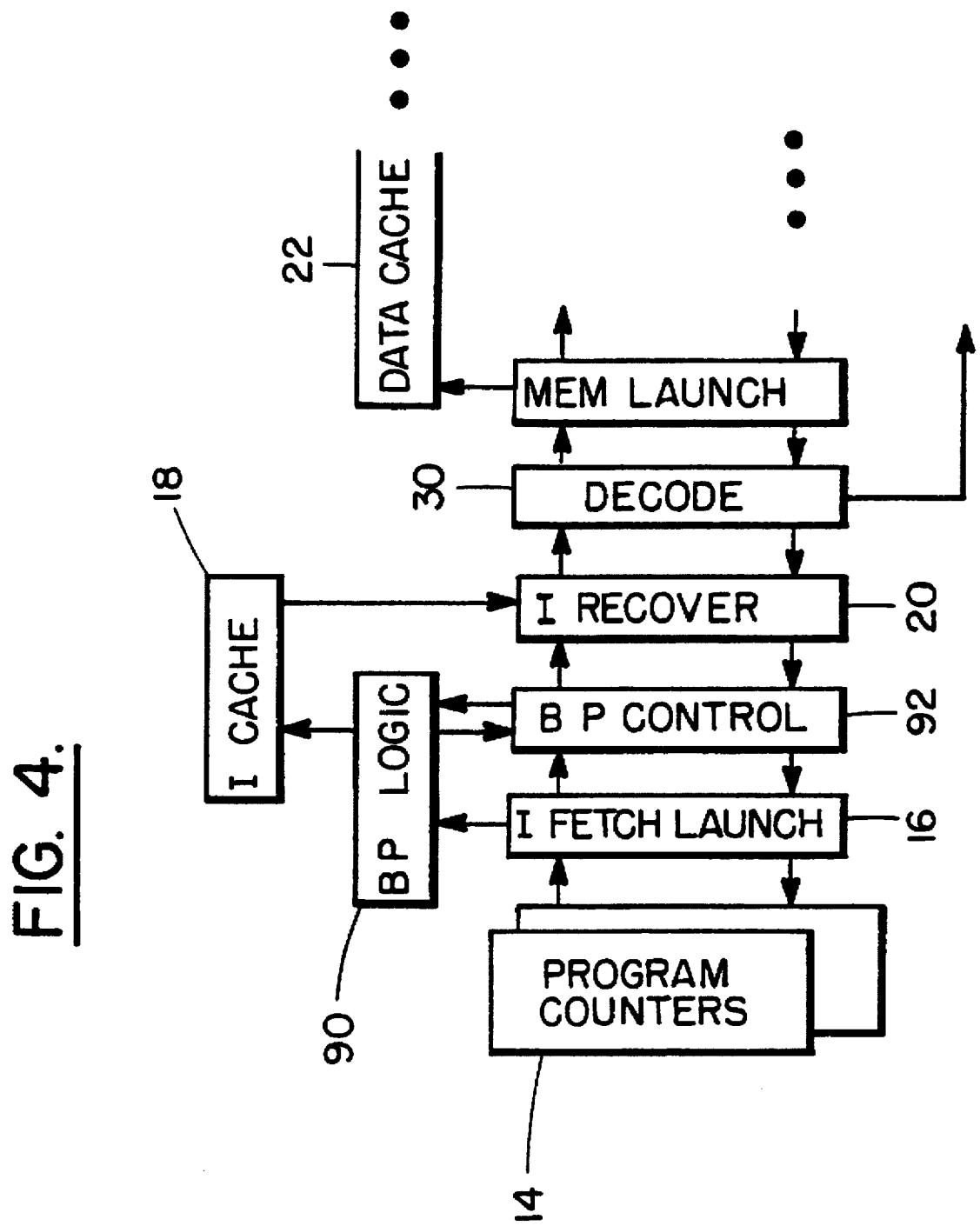
FIG. 4 is a block diagram of multiple pipeline stages that are used by the invention to predict branch addresses.

Turning to FIG. 4, the block diagram shown therein illustrates a portion of a CFPP architecture which has been modified to implement branch prediction logic. Branch prediction constitutes the prediction of a branch instruction in advance of processing the data which will enable the branch to be actually determined. Such a prediction is based upon a statistical analysis of previous data processing actions and resulting branch results. Two additional blocks are added to the CFPP architecture to implement branch prediction control, i.e. a branch prediction logic module 90 and a branch prediction control pipeline stage 92. Branch prediction logic block 90 includes memory which designates a program count indicative of an instruction that is statistically expected to result from execution of a branch-on-condition instruction.

The circuit of FIG. 4 operates in the following manner. Program counter 14 issues sequential program counts which are passed by instruction fetch launch pipeline stage 16 to branch prediction logic module 90. There, any non-branching instruction is passed directly to instruction cache 18 and the called instruction is sent to instruction recover pipeline stage 20. The instruction is then launched down the pipeline to be later decoded and executed.

If instruction fetch launch pipeline stage 16 provides a program count value to which branch prediction logic block 90 recognizes as calling for a branch-on-condition instruction, branch prediction logic 90 determines an associated "next instruction program count" that is statistically expected to result from the data processing action called for by the branch-on-condition instruction. Branch prediction logic block 90 first provides the program count of the branch-on-condition instruction to instruction cache 18 causing the branch-on-condition instruction to be passed to instruction recover pipeline stage 20, etc.

Branch prediction logic block 90 then passes the predicted next instruction count value to instruction cache 18. In response, the predicted next instruction is fed to instruction recover pipeline stage 20 where it follows the branch-on-condition instruction. At the same time branch prediction logic block 90 passes the predicted next instruction count value to branch prediction control stage 92. A flag is also set in the result register in stage 92 which causes any instruction passing it (to the right) to be invalidated. Thus, program counts, subsequent to the program count of the branch-on-condition instruction, which issue from program counters 14 are invalidated and merely propagate down the pipeline, causing no actions. The action continues until the predicted instruction count value reaches program counters 14.

When the predicted instruction count reaches program counters 14, a reset occurs to a program count value one more than the predicted program count value, which reset count value is then issued to instruction fetch launch pipeline stage 16 and the action proceeds as aforesaid. In such manner, the branch-on-condition instruction is launched down the pipeline is followed by the next predicted instruction (as predicted by branch prediction logic 90) and program counters issue a next instruction count, in sequence, after the predicted instruction.

In case a subsequent pipeline stage determines that an erroneous predicted instruction has been propagated, following a branch on condition instruction, the subsequent pipeline stage issues a branch result update and causes that update to propagate via the result pipeline. The branch result update includes a branch error flag which indicates that the previously predicted instruction address was erroneous and further includes the address of the branch-on-condition instruction which resulted in the predicted instruction.

When the branch result update is received by branch prediction control pipeline stage 92, the update is passed to branch prediction logic block 90 where the branch statistics for the specifically identified branch-on-condition instruction are updated. Further, as the result propagates (leftward) along the pipeline, all instructions traveling in the opposite direction past that branch error flag are invalidated.

Within branch prediction logic block 90, receipt of the branch error flag, along with the branch-on-condition address, enables branch prediction logic 90 to update its branch statistics for the branch address, accordingly. Branch prediction logic 90 also issues to instruction cache 18, the branch instruction count value that was not chosen previously. In response, instruction cache 18 inserts the previously non-chosen instruction into instruction recover pipeline stage 20, where it is launched down the pipeline.

Branch prediction logic 90 further issues a next instruction update count value into the result pipeline via branch prediction control pipeline stage 92. That update value travels to program counters 14 where it causes an update in the program count to a value one greater than the most recently issued branch instruction address. As the updated count value propagates leftward along the result pipeline, all instructions passing it are invalidated. Thus, the branch prediction error is corrected and the processing continues in accordance with the new instruction address.

Figure 5:
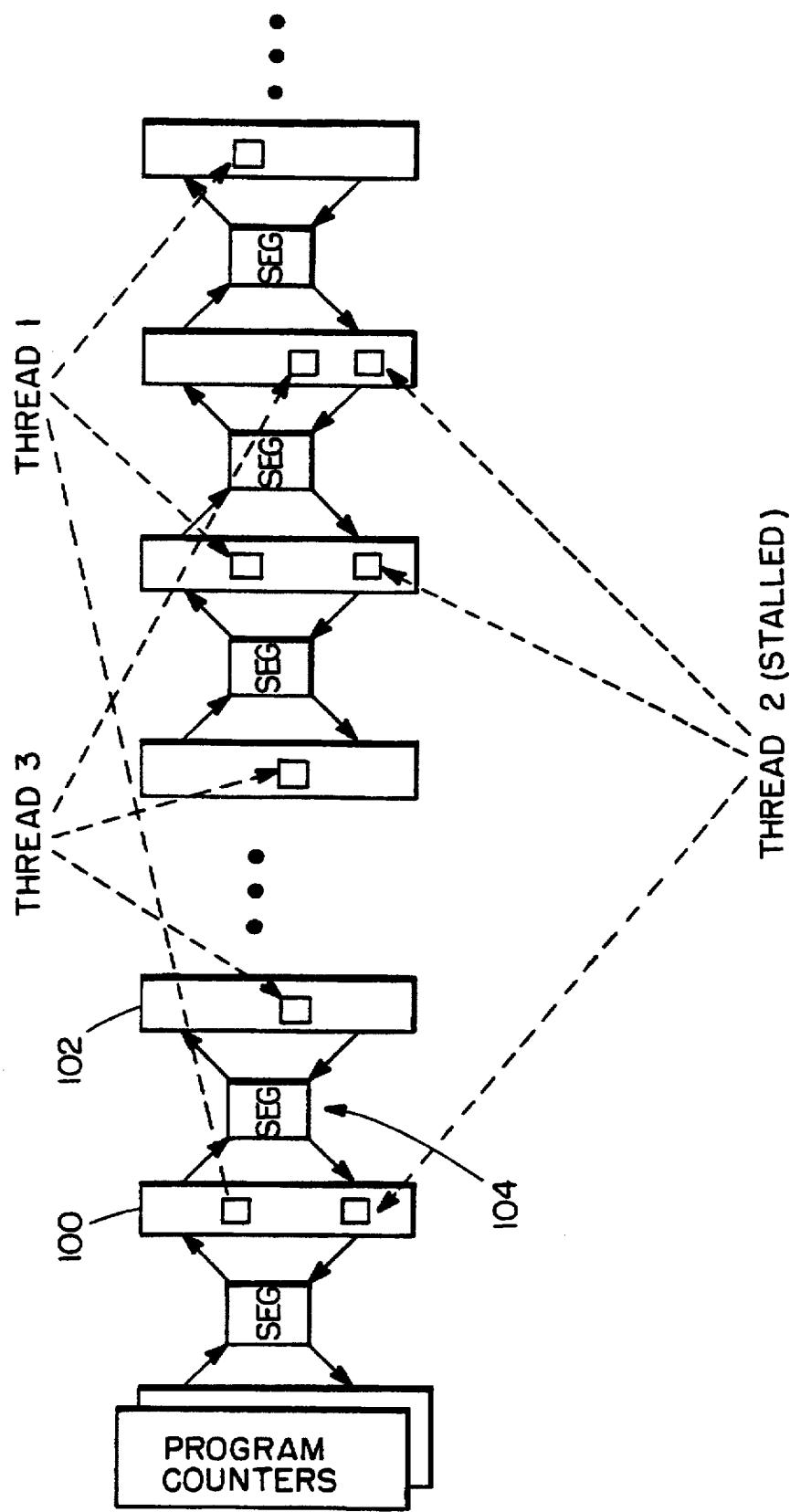
FIG. 5 is a schematic of a CFPP system that incorporates multiple thread logical processing.
Figure 6:
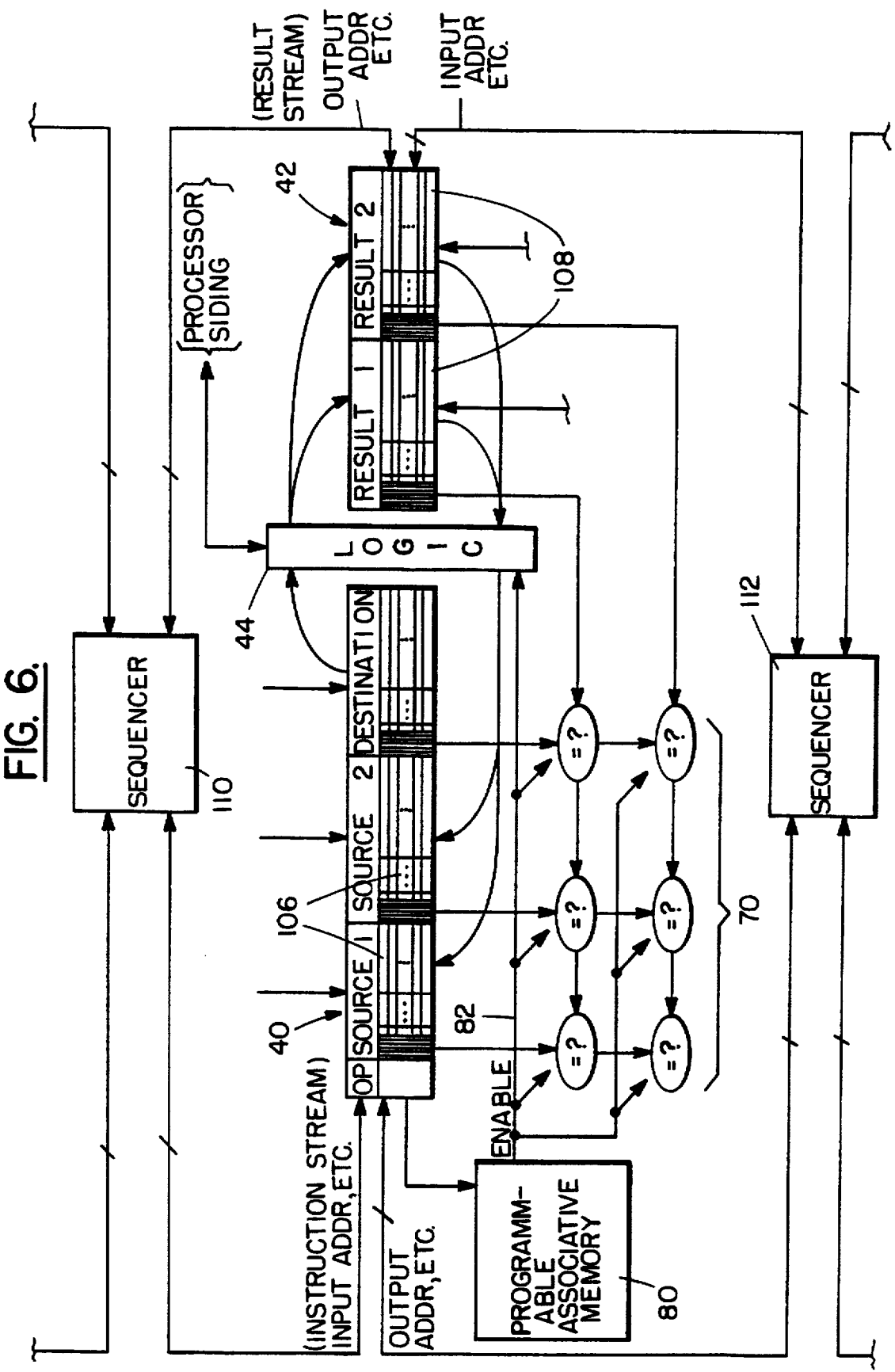
FIG. 6 shows detail of a pipeline stage used in a CFPP architecture which implements multiple thread processing.

Turning to FIG. 5, a portion of a pipeline embodying the invention has been modified to enable multi-threaded execution of independent data processing actions. In FIG. 5, details of individual pipeline stages and siding logical blocks have been eliminated. Between each pair of successive pipeline stages (e.g. 100 and 102), there resides a sequencer module 104 which controls movement of instructions and results between pipeline stages. In FIG. 6 an exemplary pipeline stage is shown that is employed in the multi-thread pipeline structure of FIG. 5. Each source and destination latch in instruction register 40 is provided with plural address positions 106. Result latches 42 are similarly provided with plural address positions 108. Assuming that there are three threads being executed on a time-shared basis, each instruction register 40 and result register 42 must contain at least three separate address positions to hold source and destination/result values from the respective threads.

Sequencer modules 110 and 112 respectively provide address designations in succeeding pipeline stages for both the result values flowing in the result pipeline and the instructions flowing in the instruction pipeline. For instance, sequencer 110 will provide output addresses in a next pipeline stage to which result values residing in result register 42 will be directed. Similarly, sequencer 112 provides an input address for results coming from a prior pipeline stage. Sequencer 110 provides an input address for instructions entering instruction register 40 and sequencer 122 provides output addresses to which the instruction in register 40 will be directed in a subsequent pipeline stage.

Assuming, as indicated above, that there are three threads in process, sequencers 110 and 112 sequence in a round-robin manner through the three threads and cause movement of individual instructions/results of each thread. However, if either sequencer determines that an instruction is about to be placed in a pipeline stage and that pipeline stage is where the instruction is to be executed, the sequencer following that pipeline stage is inhibited from transferring the instruction until a result is emplaced in the result register of that pipeline stage which has a binding value to the instruction resident therein. Thus a sequencer may be inhibited from transferring an instruction in a specific thread out of a pipeline stage until a result value is incremented into the stage that has a binding relationship to the instruction—thereby enabling execution of the instruction in that pipeline stage. Such a thread becomes "stalled" until the binding result and/or instruction arrives at the proper pipeline stage. The sequencer continues to move other threads, notwithstanding the "stalled" nature of one thread. When the stalled thread becomes ready for movement, transfer operations continue on the round-robin basis for the individual threads.

With respect to instruction which require high priority execution, one or more flags accompanying such an instruction/result can be set to be recognized by the individual sequencers. The sequencers, based upon the set flag(s), transfer those instruction/results on a priority basis and out of the round-robin order. Other threads become stalled until the high priority instruction is executed.

Figure 7:
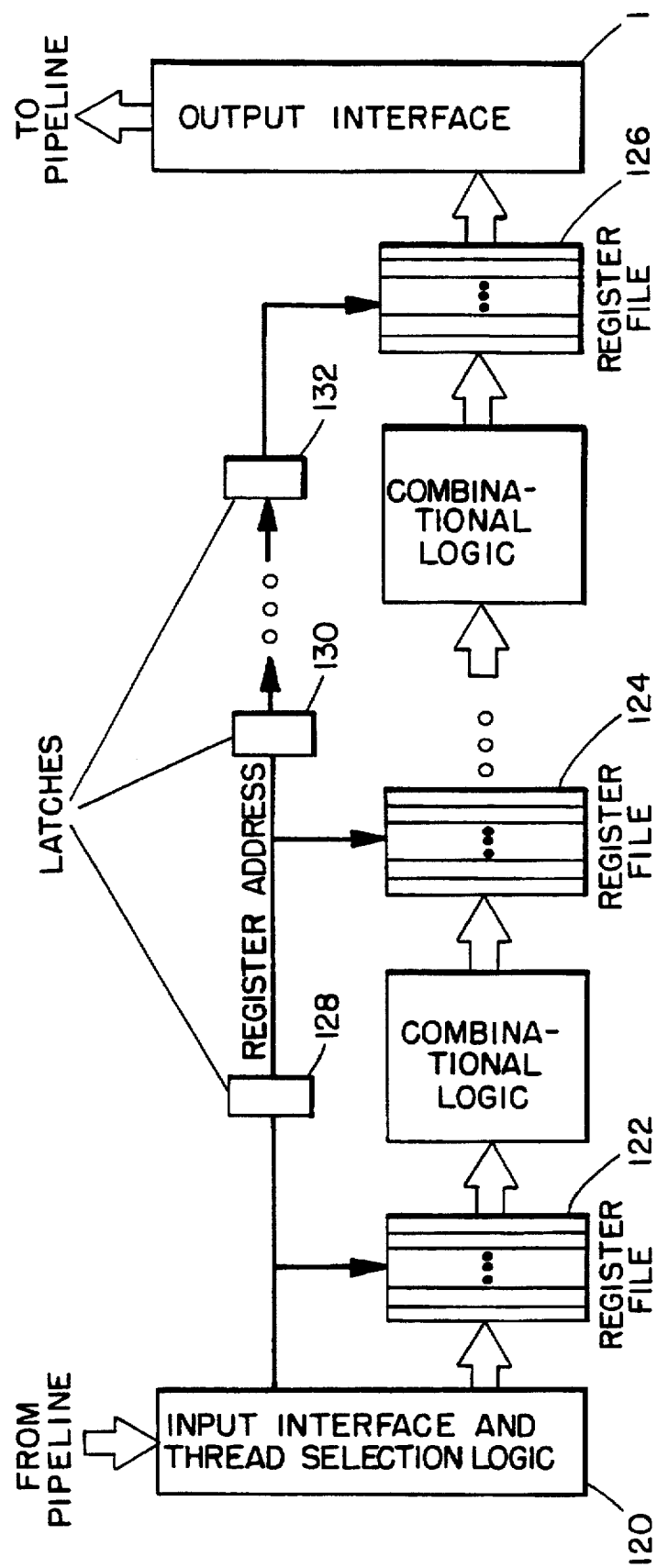
FIG. 7 is a block diagram of siding logic employed in a CFPP architecture embodying the invention.

In FIG. 7, "siding" logic stages are illustrated which are adapted for use in a multi-threaded pipeline environment. In such case, an instruction is fed from the pipeline to an input interface and thread selection logic module 120. That module assigns a set of register addresses into which the instruction values are to be inserted in register files 122, 124, 126, etc. as the particular instruction is being executed by intervening combinational siding logic blocks. As each new thread instruction is received from the pipeline, a new series of addresses are generated and inserted into latches 128, 130, 132 so as to enable proper placement of result values in the respective register files. In such manner, addresses are pipelined in the siding logical blocks so as to enable proper placement of individual thread results. After the results are generated, they are passed back to the pipeline via output interface 134. Logical operations are thus performed on individual instructions from separate threads, while maintaining a differentiation therebetween and assuring a proper sequencing of the results through the register files included in the siding.

Figure 8:
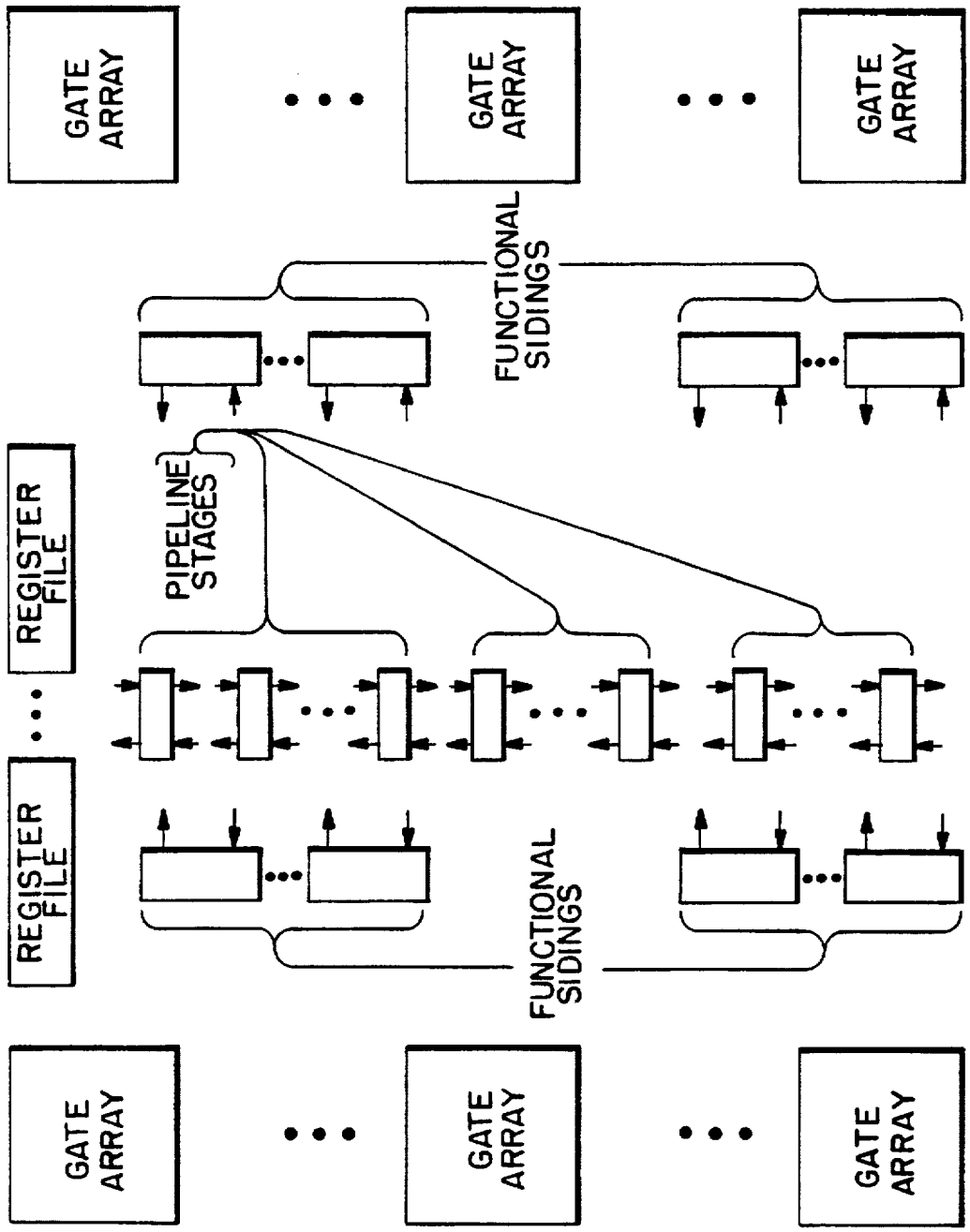
FIG. 8 is a schematic view of the components of the invention for use by a user and before definition of interconnections.

Turning to FIG. 8, a schematic shows the ASIC structure prior to user personalization. In a physical implementation (not shown), user-controlled metallization layers or programmable interconnects provide interstage coupling between various ASIC pipeline stages, which are initially unconnected. Similarly, logic module sidings are provided with appropriate logical structures to enable desired data processing action (e.g., adder, multiplier, etc.). Each of the siding modules is unconnected to the pipeline stages, which connections are designated by the user, as required in structuring the ASIC to perform a desired function. Also provided are multiple arrays of gate structures that are capable of implementing random logic or special functional units that cannot be obtained from simple customization of an existing pipeline or siding blocks.

It is to be understood that the schematic of FIG. 8 is not to be taken as a layout diagram, but is rather an indication of plural logic blocks that are provided for user interconnection, as required by the data processing function to be implemented in the ASIC. Thus, this invention enables creation of complex control blocks that are disjoint when fabricated but can be personalized and interconnected to yield control structures that operate under a CFPP paradigm. Further, low-level logic blocks, such as those found in gate arrays, are integrated with the structure and enable specific functions to be created that are not readily available from the CFPP structure. User-defined interconnections also allow customization of the CFPP architecture, in lieu of requiring large microcode developments (that are currently commonplace).

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A pipeline processor wherein instructions flow in a first direction and results flow in a second opposing direction in the pipeline, said pipeline processor comprising:

program means for issuing instructions in said first direction in said pipeline, certain said instructions including user-defined operation codes;

register means for storing and issuing results in said second opposing direction in said pipeline;

plural pipeline stages connected between said program and said register means, at least one pipeline stage comprising instruction latch means connected to receive and issue instructions in said first direction, result latch means connected to receive and issue result data in said second opposing direction, logic means coupling said instruction latch means and result latch means for determining when result data and instructions are associated and further responsive to a predetermined pipeline operation code to execute a received instruction, said logic means being non-responsive to a user-defined operation code that is related to said received instruction, to execute said received instruction, said at least one pipeline stage further including conversion means for determining a correspondence between a user-defined operation code and said predetermined pipeline-operation code and, upon occurrence of said correspondence, enabling said logic means to execute at least one operation with respect to said received instruction or result; and processing siding means coupled to at least some said plural pipeline stages for performing logical operations on said result data in accordance with pipeline operation codes.

2. A pipeline processor as recited in claim 1, wherein said program means comprises:

a program counter;

an instruction cache for storing plural instructions with operating codes;

an instruction recover pipeline stage; and an instruction fetch pipeline stage coupled to said program counter and responsive to a program count from said program counter to cause a readout of an instruction from said instruction cache into said instruction recover pipeline stage, for transmission to a subsequent pipeline stage in said first direction.

3. The pipeline processor as recited in claim 2, further comprising:

branch prediction logic means coupled to said instruction fetch pipeline stage, for manifesting a predicted next instruction program count in response to a branch-on-condition instruction and, in response to a received instruction program count corresponding to said branch-on-condition instruction, for causing said instruction cache to output a predicted next instruction to said instruction recover pipeline stage for transmission to a subsequent pipeline stage; and branch prediction control stage means coupled between said instruction fetch pipeline stage and said instruction recover pipeline stage and coupled to said branch prediction logic means, for responding to said manifestation of said predicted next instruction program count by said branch prediction logic means to transmit update result data to said program counter to cause a setting of a value thereof related to said predicted next instruction program count.

4. The pipeline processor as recited in claim 3 wherein said branch prediction logic means is controlled to accumulate statistics that indicate a most likely next instruction to be executed, upon execution of a branch-on-condition instruction.

5. The pipeline processor as recited in claim 4 wherein said branch prediction control stage means is responsive to result data propagated from another pipeline stage indicating that an instruction resulting from execution of said branch-on-condition instruction, was other than said predicted next instruction, to cause an update of said statistics in said branch prediction logic means in accordance with said result data and to issue a reset value to said program counter related to said resulting instruction.

6. The pipeline processor as recited in claim 1 wherein said instruction latch means and said result latch means in said plural pipeline stages each include plural address positions for holding instruction and result values from plural data processing procedure strings, said pipeline processor further comprising:

sequencer means coupled between said plural pipeline stages, for moving instruction and result values from each data processing procedure string on a time-shared basis.

7. The pipeline processor as recited in claim 6 wherein each said sequencer means inhibits transfer of an instruction from a pipeline stage where said instruction is to be operated upon if a result value required by said instruction is not present in said result latch means in said pipeline stage.

8. The pipeline processor as recited in claim 7, wherein said processing siding means includes plural address positions for holding instruction values from plural processing procedure strings, and means for moving said instruction values from each data processing procedure string via said plural address through said processing siding means on a time shared basis.

* * * * *